United States Patent
Perret et al.

(10) Patent No.: US 7,458,164 B2
(45) Date of Patent: Dec. 2, 2008

(54) ANGLE MEASUREMENT DEVICE

(75) Inventors: Fabien Perret, Langres (FR); Laurent Salagnac, Langres (FR)

(73) Assignee: Carl Freudenberg KG (DE)

( * ) Notice: Subject to any disclaimer, the term of this patent is extended or adjusted under 35 U.S.C. 154(b) by 224 days.

(21) Appl. No.: 11/523,800

(22) Filed: Sep. 19, 2006

(65) Prior Publication Data
US 2007/0068015 A1    Mar. 29, 2007

(30) Foreign Application Priority Data
Sep. 20, 2005    (EP) .................. 05020441

(51) Int. Cl.
*G01B 5/24* (2006.01)
*G01B 7/30* (2006.01)
(52) U.S. Cl. ......................... 33/1 PT; 33/1 N
(58) Field of Classification Search ............. 33/1 PT, 33/1 N, 706–707
See application file for complete search history.

(56) References Cited

U.S. PATENT DOCUMENTS

| | | | | |
|---|---|---|---|---|
| 5,359,434 A | * | 10/1994 | Nakao et al. | 358/481 |
| 5,774,074 A | * | 6/1998 | Cooper et al. | 341/11 |
| 5,965,825 A | * | 10/1999 | Nitecki | 73/861.77 |
| 6,438,860 B1 | * | 8/2002 | Glimm | 33/1 PT |
| 6,847,309 B2 | * | 1/2005 | Andrieu | 341/15 |
| 6,854,455 B2 | * | 2/2005 | Lingener | 123/612 |
| 7,391,009 B2 | * | 6/2008 | Feurer | 33/1 PT |

* cited by examiner

*Primary Examiner*—Yaritza Guadalupe-McCall
(74) *Attorney, Agent, or Firm*—Harness, Dickey & Pierce, PLC

(57) ABSTRACT

An angle measuring device comprising a rotating device which includes a signal-generating regular element, at least one signal-generating irregular element, and at least one sensor for acquiring the signals. The irregular element has a double extension compared to the regular element.

15 Claims, 1 Drawing Sheet

ANGLE MEASUREMENT DEVICE

CROSS-REFERENCE TO RELATED APPLICATIONS

This application claims the benefit of European Patent Application 05 020 441.1, filed Sep. 20, 2005. The disclosure of the above application is incorporated herein by reference.

FIELD

The present teachings relate to an angle measuring device. The device includes a rotating device including signal-generating elements disposed around a circumference of the rotating device. At least one sensor for acquiring the signals is also included.

BACKGROUND

The statements in this section merely provide background information related to the present disclosure and may not constitute prior art.

Angle measuring devices are known in the prior art. These devices are used to acquire angular positions and rotational speeds of, for example, crankshafts and camshafts of internal combustion engines. An angle measuring device that is a rotating device can be constructed as a multi-pole encoder with a magnetized elastomer, or as a gear wheel. In the case of a rotating device constructed as a gear wheel, the teeth and gaps of the gear wheel function as signal-generating elements, in each case a tooth and a gap being combined to form a unit. Such a gear normally comprises 58 teeth and gaps which are positioned on the circumference of the gear wheel following one another at intervals of 6°. At one point, by leaving out 2 teeth and by combining three adjacent gaps, a reference point is formed, which frequently corresponds to the top dead center of a cylinder of an internal combustion engine.

The well-established geometry of a rotating device generates a signal of 57 regular periods of 6° and one irregular period of 18°. This irregular singularity allows generating an electric period of 18° that is used as position reference for engine management. The regular portions of the impulse wheel generates one impulse every 6° that is used by engine management to determine speed and shaft position. The disadvantage of such system is that speed information is lost in the irregular position of the rotating device.

SUMMARY

The invention is based on the object of providing an angle and speed measuring device enables determination of angular speed over the whole circumference of the measuring device.

In order to achieve the object, the irregular element has a double extension in comparison to the regular element. This simple geometry enables simple interpretation by an engine management device. The double extension of the irregular element can be easily detected by the sensor so that the position of the rotating device can be located. Furthermore, due to the double extension of the irregular element, signals can be analyzed which are included in the same interval. For example, the engine management device may use signals in the extension of the regular or the irregular element for determining angle speed. Thereby a speed measurement can occur continuously over the whole circumference without loss of information.

The regular element can have an extension of about 6°, and the irregular element can have an extension of about 12°. It should be understood, however, that the extension of both the regular and irregular elements can be varied according to the specific application at hand. The extension of 6° enables a measurement with a good resolution whereby a simple sensor can be used.

Each element can be assigned two electrical signal flanks, respectively. Thereby every element is assigned a rising and a falling flank. The engine management device analyzes if the collected flank is a rising or a falling flank, and decides if the collected flank is used for determining a speed or an angle. Thereby the electrical signal flanks of the irregular element can have an extension of 6°.

The rotating device may be formed by a gear wheel, for example. Here, the gear wheel can be formed as a stamped part, as a sintered component, or as a deep-drawn component that is robust with respect to external influences.

The elements can be formed by the teeth of the gear wheel. The acquisition of the teeth and the gaps can be determined by means of an optical measuring method or an electromagnetic measuring method. In the case of an electromagnetic measuring method, the gear wheel forms a passive encoder which is registered by a passively or actively designed sensor. A passive sensor may use an inductive measurement principle, and an active sensor may be formed by a Hall sensor arrangement.

The teeth may each have an upper portion (i.e., a top or crest of the tooth) and a lower portion (i.e., a bottom or trough between adjacent teeth). Between the upper and lower portion of the irregular element, however, a mid-portion or plateau can be arranged. The plateau results in a smaller width of the lower portion, and a steep signal results that may be measured by the sensor. Thus, a central position of the lower portion can be detected more precisely.

The plateau may be arranged at about half the tooth height. In this manner, a good signal can be measured.

The plateau may have a slope that increases toward the lower portion. Such a configuration assists in improving signal quality. Further, the central position of the lower portion can be detected more precisely The irregular element may include a TDC marking of an internal combustion engine. In this case, the TDC marking is preferably arranged in the center of the lower portion.

The object is also achieved by a method for measuring the angular speed of a rotating device including an angle measuring device comprising a step of detecting each intervals of 6° arranged at flanks by a sensor whereas simultaneously a time measurement occurs by which the angular speed is gained. Thereby a speed measurement can occur continuously over the entire circumference without loss of information.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
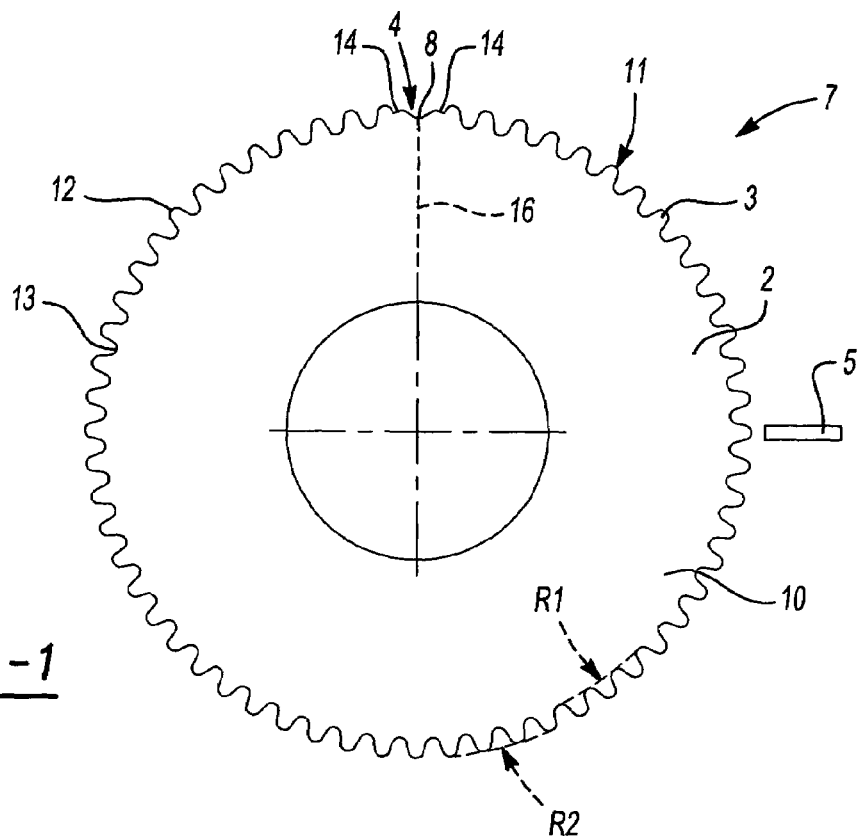
FIG. 1 shows an angle measuring device according to the present teachings.

FIG. 1 shows an angle measuring device 1 according to the present teachings. The angle measuring device 1 comprises a rotating device 2 which may be formed as, for example, a gear wheel 10. The gear wheel 10 includes signal-generating elements 3 and 4 disposed around a circumference thereof. The signal-generating elements 3 and 4 are formed by teeth 11 of the gear wheel 10. The signals are acquired by means of a sensor 5, which can be formed as an inductive sensor or as a Hall sensor, or any other sensor known in the art. In other embodiments, an optical measuring method can also be used.

As compared to the other signal-generating elements 3, at least one element 4 is formed irregularly whereby the irregular element 4 has a double extension in comparison to the regular element 3. In this embodiment, the regular element 3 has an extension of about 6°, and the irregular element 4 has an extension of about 12°.

The irregular element 4 forms a reference point 16 which corresponds to the top dead center of an internal combustion engine. The teeth 11 have upper portions or tops 12 and lower portions or bottoms 13. Between the top 12 and the bottom 13 of the irregular element 4 is arranged a mid-portion or plateau 14. The plateau 14 is preferably arranged at a position located at about half the tooth height.

In other embodiments the position of the bottom 13 of the irregular element 4 is variable. The lowest position of the bottom 13 of the irregular element is equivalent to R1 and the highest position is equivalent to the product of R1+(0.5×(R2−R1)). The position of the plateau 14 is between R1 and R2.

The method for measuring the angular speed of the rotating device 2 including the angle measuring device 1 comprises a step of detecting elements 3 and 4 at intervals of about 6° with a sensor 5. Simultaneously, time measurement occurs by which the angular speed is gained.

Figure 2:
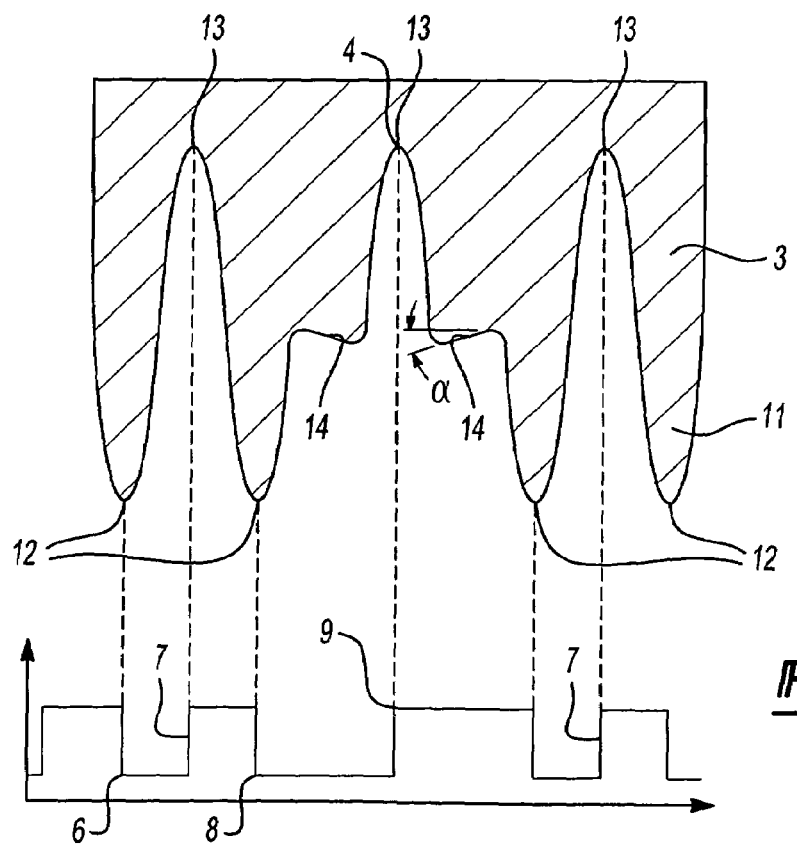
FIG. 2 shows in detail the irregular element.

FIG. 2 shows the irregular element 5 according to FIG. 1 in detail. The signal-generating elements 3 and 4 are formed by the teeth 11 of the gear wheel 10. The teeth 11 have tops 12 and bottoms 13. Between the top 12 and the bottom 13 of the irregular element 4 is arranged a plateau 14. The plateau 14 is arranged at a position located at about half the tooth height. In this embodiment, the plateau 14 has a slope that increases towards the bottom 13. The gradient angle α of the plateau 14 amounts to about 20°. Each element 3 and 4, include two electrical signal flanks 6 and 7 and 8 and 9, respectively. A falling electrical flank 6 and 8 is assigned to the top 12, and a rising flank 7 and 9 is assigned to the bottom 13. The electrical signal flanks 8 and 9 of the irregular element 4 have an extension of 6°.

What is claimed is:

1. An angle measuring device comprising:
a rotating device; and
at least one sensor disposed at said rotating device,
wherein said rotating device includes a signal-generating regular element and at least one signal-generating irregular element, said regular element having a first extension and said irregular element having a second extension, said second extension being double the first extension;
said rotating device is formed by a gear wheel;
said regular and irregular elements are formed by a plurality of teeth of said gear wheel;
said teeth each have an upper portion and lower portion, and between said upper portion and said lower portion of said irregular element a mid-portion is arranged; and
said mid-portion is arranged at a position located at about half a height of said teeth.

2. The angle measuring device according to claim 1, wherein said first extension of said regular element is about 6° and the second extension of said irregular element is about 120°.

3. The angle measuring device according to claim 1, wherein both said regular element and said irregular element include a pair of electrical signal flanks.

4. The angle measuring device according to claim 3, wherein said electrical signal flanks of said irregular element have an extension of about 6°.

5. The angle measuring device according to claim 1, wherein said mid-portion has a slope that increases in a direction towards said lower portion.

6. The angle measuring device according to claim 1, wherein said irregular element is assigned a TDC marking of an internal combustion engine.

7. A method for measuring the angular speed of a rotating device including an angle measuring device according to claim 1, comprising:
a step of detecting at intervals of about 6° arranged flanks with said sensor; and
simultaneously measuring time to determine angular speed.

8. A device comprising:
a rotating device including a plurality of sensor elements; and
a sensor disposed adjacent said rotating device that senses a position of said sensor elements;
wherein said sensor elements include a plurality of first elements and at least one second element, said sensor elements being disposed around an outer surface of said rotating device,
said first elements each including an upper portion and a lower portion, and
said second element including an upper portion, a mid-portion, and a lower portion; and
said mid-portion has a slope that increases in a direction toward said lower portion.

9. The device of claim 8, wherein rotating device is a gear wheel, and said sensor elements are teeth of said gear wheel.

10. The device of claim 8, wherein said mid-portion of said second element is a plateau between said upper portion and said lower portion.

11. The device of claim 8, wherein said second element forms a reference point for said sensor.

12. A device comprising:
a gear wheel including a plurality of teeth acting as a plurality of sensor elements, said sensor elements being disposed around a circumference of said gear wheel; and
a sensor disposed adjacent said gear wheel;
wherein said sensor elements include a plurality of regularly shaped teeth and at least one irregularly shaped tooth, said regularly shaped teeth each including an upper portion connected to a lower portion by a smoothly formed sidewall,
said irregularly shaped tooth including an upper portion connected to a lower portion by a sidewall including a plateau formed therein having a slope that increases in a direction toward the lower portion, and said irregularly shaped tooth acts as a reference point for said sensor.

13. The device of claim 12, wherein a gradient angle of said plateau relative to said sidewall of said irregularly shaped tooth is about 20°.

14. The device of claim 12, wherein said regular shaped teeth have an extension of about 6° and said irregularly shaped tooth has an extension of about 12°.

15. The device of claim 12, wherein said sensor is a Hall sensor or an inductive sensor.

* * * * *